United States Patent [19]

McGrogan, Jr.

[11] 3,784,844

[45] Jan. 8, 1974

[54] CONSTANT CURRENT CIRCUIT

[75] Inventor: Ellwood Patrick McGrogan, Jr., Cherry Hill, N.J.

[73] Assignee: RCA Corporation, New York, N.Y.

[22] Filed: Dec. 27, 1972

[21] Appl. No.: 319,006

[52] U.S. Cl. .................. 307/270, 307/297, 307/310, 307/311

[51] Int. Cl. .............................................. H03k 1/04

[58] Field of Search .................... 307/237, 270, 296, 307/297, 310, 311

[56] References Cited

UNITED STATES PATENTS

| | | | |
|---|---|---|---|
| 3,359,433 | 12/1967 | Thauland | 307/262 X |
| 3,550,087 | 12/1970 | Ross et al. | 330/69 X |
| 3,560,770 | 2/1971 | Gieles | 307/214 X |
| 3,659,121 | 4/1972 | Frederiksen | 307/296 X |

*Primary Examiner*—John Zazworsky
*Attorney*—H. Christoffersen et al.

[57] ABSTRACT

A constant current circuit is disclosed which is useful, for example, in a system in which a constant current is supplied to one selected light emitting diode in an array of diodes. The constant current circuit, when energized, supplies a constant current through an output transistor to terminals of a row of light emitting diodes. The current flows through a selected one of the diodes having a closed return-path switch. The constant current is generated by coupling a constant reference voltage developed across a reference voltage diode through a semiconductor device to input electrodes of the output transistor. The coupling is constructed so that changes in the junction voltage drop of the semiconductor device, due to temperature, balance changes in the base-emitter voltage drop in the output transistor, when both are rendered conductive by a logic signal applied thereto.

17 Claims, 3 Drawing Figures

CONSTANT CURRENT CIRCUIT

BACKGROUND OF THE INVENTION

CMOS (Complementary Metal-Oxide-Semiconductor) logic elements are often used in tactical equipment because of their low power consumption and ability to operate reliably under variations of temperature and power supply drift. Such equipment, when requiring alphanumeric or numeric displays, frequently use light emitting diode (LED) arrays because of their low operating voltages, reliability, and relatively low power requirements. These characteristics of LEDs make them extremely compatable with CMOS logic circuits.

An LED has a light output which varies in direct proportion to the current flowing through it. One type of LED commonly used is a gallium arsenide diode. It has a typical voltage drop of 1.2 volts and requires a constant current typically in the range from 5 to 20 milliamperes, depending upon its size and desired illumination.

One technique for driving an LED is to connect a high value current limiting resistor and the LED in series across a high voltage, high current, and stable voltage supply. Tactical equipment usually operates from low voltage and unregulated voltage supplies such as a 6 volt dry cell battery or the like. In this type of constant current supply, precise control of the current, and thereby the brightness in each diode, is difficult to achieve because the voltage drop across the light emitting diode may be a significant fraction of the supply voltage. This is especially true towards the end of battery life. Further, variations in supply voltage cause proportional changes in the current supplies to the LED.

In another type of constant current supply that may be employed to drive an LED, the constant current flowing to the LED flows through the collector-emitter path of an output transistor and is determined by the establishment of a reference voltage, derived from a supply voltage, across a stable precision current-control resistor. This type of constant current supply eliminates the adverse effects of variations in the supply voltage. However, in this type of constant current supply it is common for the reference voltage to be coupled across the current-control resistor via a circuit path including the base-emitter semiconductor junction of the output transistor. The voltage across the current-control resistor is therefore dependent on the voltage drop across the base-emitter semiconductor junction of the output transistor and is subject to variations thereof due to operating conditions such as temperature. These variations cause the current supplied to the LED to vary and, consequently, its light output also varies.

In one type of LED array, each element of the array comprises an LED and a series connected switch. The elements of the array are arranged in a matrix having rows and columns. Each element within a row is connected to a constant current supply circuit. When a switch is closed, the associated LED is connected to the return of the row constant current supply circuit. In this type of LED array, all the switches within a column are closed simultaneously. Therefore, to achieve two dimensional control, it is necessary to be able to selectively activate and inactivate the row constant current supply circuit.

The present invention concerns a transistorized constant current supply circuit wherein a constant current is determined by the establishment of a reference voltage across a current-control resistor. The adverse effects of the base-emitter semiconductor voltage drop of the output transistor, contributing to the voltage established across the current-control resistor, are cancelled out by a semiconductor device which may have the additional function of selectively activating and inactivating the constant current supply circuit.

SUMMARY OF THE INVENTION

A constant current path includes an output transistor and a load connected between power supply terminals. A current control resistor and the base-emitter junction of the output transistor are connected in series between a power supply terminal and a junction point. A reference voltage device and a semiconductor device are connected between the same terminal and junction point. The junction voltage drops of the base-emitter junction and the semiconductor device vary in like manner, whereby the voltage across the current-control resistor is constant and a constant current is made to flow in the constant current path.

An additional feature is that a control means may be coupled to the aforementioned common junction to render the transistor and semiconductor device either conductive concurrently or nonconductive concurrently.

BRIEF DESCRIPTION OF THE DRAWINGS

Like reference designations in different figures identify like elements. Further, whenever a voltage is mentioned within the remainder of the specification it is to be taken as meaning with reference to the potential of terminal T2, as is labeled in each of the figures, unless otherwise specified.

DETAILED DESCRIPTION OF THE DRAWINGS

Figure 1:
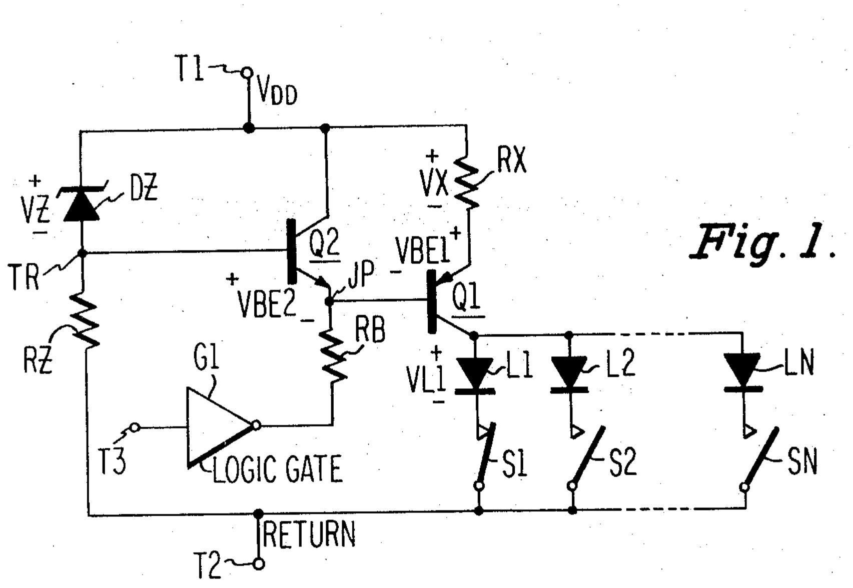
FIG. 1 is a schematic diagram of a circuit providing a constant current and embodying the invention.

FIG. 1 is a schematic diagram of a circuit for providing a constant current from a low current and unregulated voltage source. Terminal T1 is connected to the high side of the voltage source, not shown, which provides supply voltage VDD. Terminal T2 is connected to the return side of the voltage source. A group of LEDs, L1 through LN, and respective serially connected switches, S1 through SN, constitute a row of an LED array and are the load element of the circuit. Each LED and associated switch is also a member of a column, the remainder of which is not shown, of the LED array. Each LED, L1 through LN, has its cathode connected to the normally opened contact of its associated switch. The series combinations of LEDs and associated switches are connected in parallel between terminal T2 and the collector of PNP transistor Q1, the anode of each LED being connected to the collector. All the switches within a column are simultaneously opened and closed. Each switch, S1 through SN, is shown as a single pole, single throw switch, but may be any other suitable type of switching element, such as a transistor.

Current-control resistor RX is connected between terminal T1 and the emitter of transistor Q1.

A "constant" voltage device, illustrated as a Zener or reference voltage diode DZ, and resistor RZ are connected in series, in the order named, between terminals T1 and T2, the cathode of reference voltage diode DZ being connected to terminal T1. As will subsequently be described, reference voltage VZ is developed across reference diode DZ, and the difference between supply voltage VDD and reference voltage VZ appears at reference voltage terminal TR. The operating characteristics of reference voltage diode DZ are such that a positive and stable reference voltage VZ is generated between its cathode and its anode when a current exceeding a predetermined value is caused to flow through it from cathode to anode. The value of resistor RZ is selected to allow the proper current to flow through voltage reference diode DZ. The series combination of resistor RZ and voltage reference diode DZ may be shared among a multiplicity of similar circuits, resulting in an overall component and power reduction.

Reference voltage terminal TR is connected to the base of NPN transistor Q2. The collector of transistor Q2 is connected to terminal T1 while its emitter is connected to the base of transistor Q1 at junction point JP. Transistor Q2, as will be explained, serves both to selectively couple and decouple transistor Q1 from reference voltage terminal TR, and to cancel out variations in the base-emitter semiconductor junction voltage drop, VBE1, of transistor Q1. With transistor Q2 removed from the circuit and reference voltage terminal TR connected directly to junction point JP, the combination of resistor RZ, voltag reference diode DZ, resistor RX, and transistor Q1, with its collector connected load, comprise a commonly used "constant" current circuit. The operation of this combination will later be explained in detail in conjunction with the operation of transistor Q2. Although transistor Q1 and transistor Q2 are of opposite conductivity types, they are preferably selected to have matched operating characteristics, whereby such parameters as the base-emitter voltage, VBE, at a specified base current and specified collector-emitter voltage, are essentially the same for both transistors and tend to track each other over operating conditions such as temperature. In any event, the transistors should be selected so that VBE variations as a function of temperature or other operation conditions track each other in the two transistors.

Resistor RB couples junction point JP and the output terminal of logic gate G1. The input of logic gate G1 is connected to terminal T3. Control signals are applied to terminal T3 to simultaneously control the conduction of transistors Q1 and Q2 as will subsequently be explained. In the apparatus described, logic gate G1 preferably is a CMOS logic inverter but, in general, may consist of any logic configuration compatible with the circuit.

In practice the supply voltage, VDD, connected to terminal T1, typically may range from +4 to +6 vdc. Voltage reference diode DZ then is selected to provide a reference voltage of approximately +3 vdc when supplied with the proper operating current as determined by resistor RZ. Resistor RZ is selected in the range from 1 to 3 kilohms, assuming that terminal TZ is at ground potential. Resistor RX is selected in the range from 100 to 600 ohms, depending upon the constant current required by the LEDs. Resistor RB may be selected in the range of from 2 to 5 kilohms.

In operation, resistor RZ essentially determines the current flowing through voltage reference diode DZ since the impedance seen looking into the base of transistor Q2 is relatively high compared to the value of resistor RZ. The current flowing through voltage reference diode DZ establishes reference voltage VZ across reference voltage diode DZ. The voltage at the reference voltage terminal TR is the difference between supply voltage VDD and reference voltage VZ.

The illumination of a particular LED within the array is accomplished by closing all the switches within a column and activating the particular row constant current supply coupled to the particular LED to be illuminated. For purposes of explanation, it is assumed that switch S1 is closed while all the other switches, S2 through SN, are opened. Alternatively, any one of the other switches, S2 through SN, may be closed to drive a corresponding LED, L2 through LN, within a row. It is to be noted that no more than one switch within a row is to be closed at a time in the present embodiment.

When it is desired to activate the particular row constant current supply in FIG. 1, a high level (binary "1") is applied to terminal T3. As a result, the output of logic gate G1 is clamped to the return of the voltage supply via internal connections, not shown. A transistor is biased into its active region when its base-emitter junction is forward biased and its base-collector junction is reverse biased. Since the voltage, VDD-VZ, at the base of transistor Q2 is greater than the emitter voltage of Q2, approximately the potential at return terminal T2, but less than the voltage VDD at the collector of transistor Q2, transistor switch Q2 is biased into its active mode. It is to be noted that although transistor Q2 is switched fully "off" when gate G1 receives a binary "0" input, it is never switched fully "on" or into saturation, but merely into its active mode of operation, when gate G1 receives a binary "1" input. Transistor Q2 is an emitter follower and according to the well known principles of operation of this configuration, the voltage at the emitter of transistor Q2 (junction point JP) is VDD-VZ-VBE2, where VBE2 is the base-emitter semiconductor junction voltage drop of transistor Q2 when transistor Q2 is in its active or conductive mode.

When NPN transistor Q2 is rendered active, transistor Q1 is also rendered active since its base voltage, VDD-VZ-VBE2, is less than its emitter voltage but greater than its collector voltage. When transistor Q1 is rendered conductive, LED L1 is forward biased and therefore rendered conductive, establishing the junction voltage drop, VL1, of LED L1, at the collector of transistor Q1. In this embodiment, LED L1 must be chosen so that its junction voltage drop, VL1, is less than VDD-VZ-VBE2 (the voltage at the base of transistor Q1) to ensure that conductivity of transistor Q1. For the same reason, the semiconductor junction voltage drop of each LED, L2 through LN, must also be less than VDD-VZ-VBE2.

The circuit path consisting of current-control resistor RX and the base-emitter junction of transistor Q1 is connected in parallel with the circuit path consisting of reference voltage diode DZ and the base-emitter junction of transistor QZ between terminal T1 and junction point JP. If transistors Q1 and Q2 are selected to have essentially matched operating characteristics, the base-emitter junction voltage drop, VBE1, of conductive transistor Q1 is essentially equal to the base-emitter junction voltage drop, VBE2, of conductive transistor Q2. The base-emitter junction voltage drops of transistors Q1 and Q2 being essentially equal, the voltage drops across reference voltage diode DZ and current-control resistor RX are also essentially equal. Therefore, when transistors Q1 and Q2 are rendered conductive, the voltage, VX, established across current-control resistor, RX, is substantially equal to the reference voltage VZ. Even if transistors Q1 and Q2 are not selected to have matched operating characteristics and are merely selected so that the base-emitter junction voltage drop, VBE1, of conductive transistor Q1 varies in substantially the same manner as the base-emitter junction drop, VBE2, of conductive transistor Q2, with changes in operating parameters, the voltage, VX, established across current-control resistor, RX, will be substantially free of the adverse effects of the variations of the base-emitter junction voltage, VBE1, of transistor Q1.

The current through current-control resistor RX is of course determined by its resistance value RX and the voltage established across it, approximately reference voltage VZ. Essentially the same current that flows through the emitter of Q1 flows through its collector to LED L1 since its base current is relatively small compared to its emitter current.

When no LEDs within a row are to be drive the constant current supply for that particular row is inactivated or placed in a standby condition by applying a low level (binary "0") to terminal T3. When the signal at terminal T3 drops to a low level, the output voltage of logic gate G1 rises to a high level, approximately VDD, by virtue of internal connections, not shown. This high level reverse biases both the base-emitter semiconductor junctions of NPN transistor Q1 and PNP transistor Q2 and each transistor is removed from its active or conductive mode of operation and is rendered nonconductive or cut-off. When transistors Q1 and Q2 are cut-off, no current is conducted to an LED whether or not its corresponding switch is closed.

Figure 2:
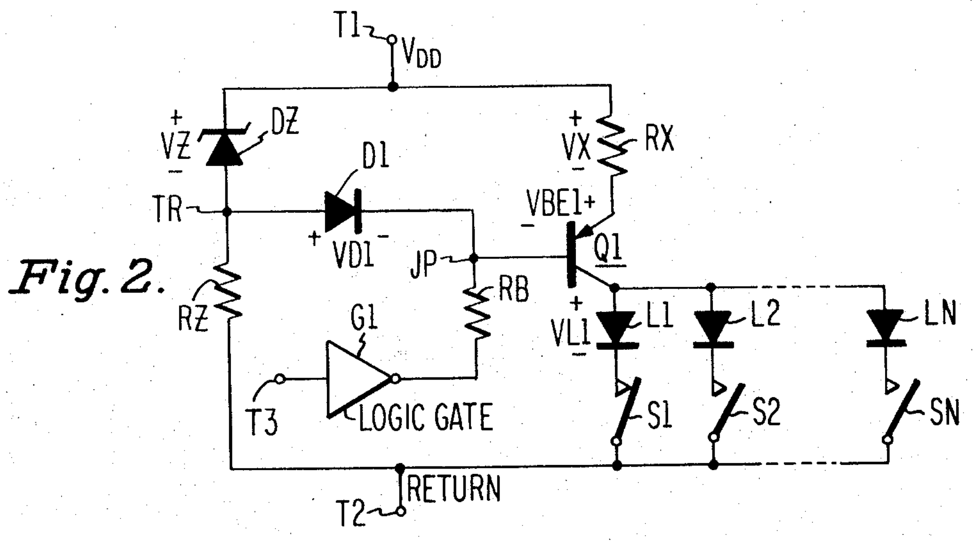
FIG. 2 is a schematic diagram of a modification to the circuit of FIG. 1.

FIG. 2 is a schematic diagram of a modification to the circuit in FIG. 1, in which transistor Q2 of FIG. 1 is replaced by diode D1. The anode of diode D1 is connected to reference voltage terminal TR. The cathode of D1 is connected to junction point JP. Diode D1 preferably is selected so that the semiconductor junction voltage drop, VD1, between its anode and cathode, when it is conductive, matches as closely as possible the base-emitter semiconductor junction voltage drop, VBE1, of transistor Q1, when it is conductive. Diode D1 has the same functions as does transistor Q2 in FIG. 1.

The operation of the circuit in FIG. 2 is essentially the same as the operation of the circuit in FIG. 1. A particular LED is selected to receive the constant current when its associated switch is closed, and a row constant current supply is activated by the application of a high level (binary "1") to terminal T3. When the control voltage of terminal T3 is at a high level the output of logic gate G1 is clamped to the return potential of the voltage supply via internal connections not shown, biasing diode D1 and transistor Q1 into an active or conductive mode. In this circuit, the semiconductor junction voltage drop, VD1, across diode D1 essentially cancels the semiconductor junction voltage drop, VBE1, across the base-emitter semiconductor junction of transistor Q1 in the same manner as does the semiconductor junction voltage drop, VBE2, across the base-emitter semiconductor junction of transistor Q2 in the circuit of FIG. 1 as previously described. As in the circuit of FIG. 1, the voltage VX established across resistor RX, is approximately the reference voltage, VZ, and the current flowing through the emitter of transistor Q1 is again determined by reference voltage VZ and the value resistor RX. Since the base current of transistor Q1 is small compared to its emitter current, the emitter current and collector current of transistor Q1 are essentially the same. Therefore, the current flowing through the collector-emitter semiconductor junction of transistor Q1, LED L1 and its corresponding closed switch S1, to return terminal T3 is essentially determined by the voltage VX, established across resistor RX, and the value of RX.

When no LEDs within a row are to be driven a low level (binary "0") is applied to terminal T3. Here, as in the circuit of FIG. 1, when a low level is applied to terminal T3, the output of logic gate G1 rises to a high level, approximately VDD. This high level reverse biases both the anode-cathode semiconductor junction of diode D1 and the base-emitter semiconductor junction of PNP transistor Q1, thereby rendering each device non-conductive or cut-off. When diode D1 and transistor Q1 are cut-off, no current is conducted to an LED whether or not its corresponding switch is closed.

Figure 3:
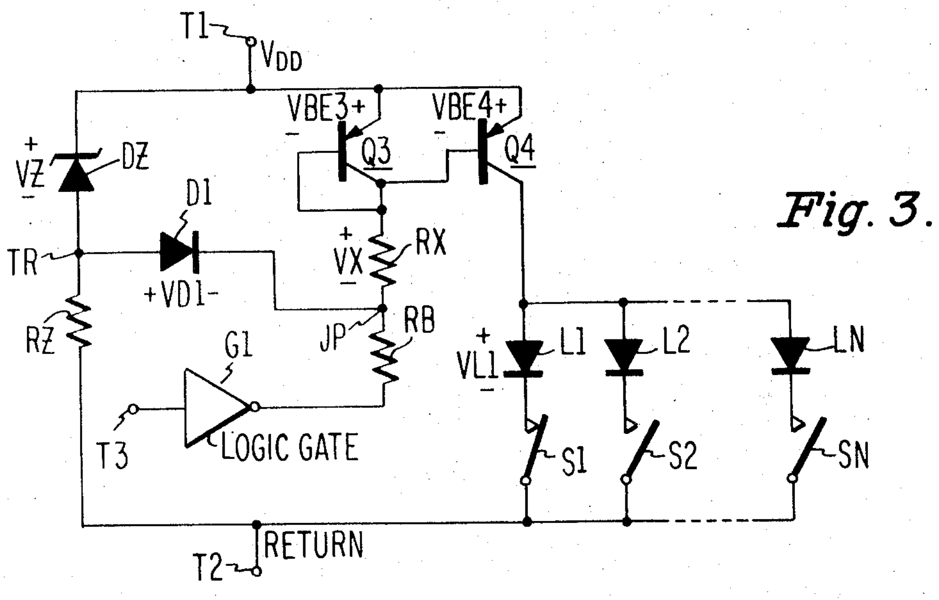
FIG. 3 is a schematic diagram of another circuit providing a constant current and embodying the invention.

FIG. 3 is a schematic diagram of a circuit which also generates and supplies a constant current to a load consisting of a row of an LED array and is another embodiment of the invention. As in FIGS. 1 and 2, the load consists of the parallel combination of the circuit paths consisting of LEDs L1 through LN respectively connected in series to switches S1 through SN. The anodes of the LEDs, L1 through LN, are jointly connected to the collector of PNP transistor Q4. The closure of a switch connects the cathode of its associated LED to the return of a voltage supply, not shown, connected to terminal T2. The emitter of transistor Q4 is connected to the high side of the voltage supply connected to terminal T1.

As in FIGS. 1 and 2, voltage reference diode DZ and resistor RZ are connected in series, in the order named, between terminals T1 and T2 so that the difference between the supply voltage, VDD, and the reference voltage, VZ, generated by voltage reference diode DZ, is established at the common junction, reference voltage terminal TR, between voltage reference diode DZ and resistor RZ.

As in FIG. 2, the anode of diode D1 is connected to reference voltage terminal TR. The cathode of diode D1 is connected to junction point JP. Current-control resistor RX is connected between the jointly connected base and collector of PNP transistor Q3 and junction point JP. The base-emitter semiconductor junction of diode connected transistor Q3 is connected in parallel with the base-emitter semiconductor junction of transistor Q4 to form a current mirroring circuit whose function will subsequently be described. Diode D1 has the dual function of selectively allowing the coupling and decoupling of transistors Q3 and Q4 from reference voltage terminal TR and of cancelling the base-emitter semiconductor voltage drops, VBE3 and VBE4, of transistors Q3 and Q4, respectively, as will be subsequently described.

As in FIGS. 1 and 2, terminal T3 is connected to the input of a logic gate G1. The output of logic gate G1 is coupled to junction point JP via resistor RB. Control signals are applied to terminal T3, as before, to control the simultaneous conduction of diode D1 and transistors Q3 and Q4. As in FIGS. 1 and 2, logic gate G1 is preferably a CMOS inverter but may be any suitable logic element compatible with the circuit.

Transistors Q3 and Q4 are selected so that their operating characteristics are matched and will track one another in an operating environment. Consequentially, the base-emitter semiconductor junction voltage drops, VBE3 and VBE4, respectively, of transistors Q3 and Q4, are substantially equal when the transistors are rendered conductive. In practice, this may be accomplished by constructing both transistors in the same substrate. Diode D1 is selected so that the semiconductor junction voltage drop, VD1, between its anode and cathode essentially equals the equal base-emitter junction drops of transistor Q3 and Q4, when all the devices are rendered conductive.

The configuration of transistors Q3 and Q4 performs a function commonly known as current mirroring. That is, the current flowing into the emitters of Q3 and Q4 are substantially identical. Since the respective voltages, VBE3 and VBE4, between the base and emitter of transistors Q3 and Q4 are made identical by circuit configuration, and since their base-emitter operating characteristics are closely matched, the current through each of the emitters will be substantially identical.

In operation, as in the circuits of FIGS. 1 and 2, the voltage developed at reference voltage terminal TR is the difference between the unregulated supply voltage, VDD, and the reference voltage, VZ, developed across diode VZ. As before, then a particular LED is to be driven, the switches of the column in which it is located are closed and its row constant current supply is activated by applying a high level (binary "1") to terminal T3. When a high level is applied to terminal T3, the output of logic gate G1 is clamped essentially to the return potential of the voltage supply via an internal path, not shown. The diode D1 is thereby forward biased rendering it conductive. Transistors Q3 and Q4 are also rendered conductive by virtue of the voltage established at their jointly connected bases.

The circuit path consisting of the parallel combination of the base-emitter semiconductor junctions of transistors Q3 and Q4 connected in series with current-control resistor RX is connected in parallel with the circuit path consisting of reference voltage diode DZ and diode D1 between terminal T1 and junction point JP. Since diode D1 is selected to have a junction voltage drop, VD1, which is essentially equal to the equal base-emitter semiconductor voltage drops, VBE3 and VBE4 of transistors Q3 and Q4, respectively, the drops across reference voltage diode DZ and current-control resistor RX are also essentially equal. Therefore, when transistors Q3 and Q4 are rendered conductive, the voltage VX, established across current-control resistor RX, approximately equals the reference voltage, VZ.

The current flowing through current-control resistor RX is of course determined by its resistance value RX and the voltage across it, approximately reference voltage VZ. The current flowing through the emitter of diode connected transistor Q3 is essentially the same current flowing through resistor RX since only a relatively small amount of current, compared to the current flowing through resistor RX, flows into the high impedance base circuit of transistor Q4. The emitter current of transistor Q4 essentially mirrors the emitter current of transistor Q3 for the reasons previously stated. Since the base current in transistor Q4 is a small fraction of the emitter current of transistor Q4, the current flowing through the collector of transistor Q4 essentially equals the current flowing through resistor RX. Closed switch S1 provides a current path from the collector of transistor Q4, through LED L1, to the return of the voltage supply.

As before, when no LEDs within a row are to be driven the row constant current supply is inactivated by applying a low level (binary "0") to terminal T3. When terminal T3 is supplied with a low level, the output of logic gate G1 is clamped essentially to supply voltage VDD. Diode D1 and the base emitter junctions of transistors Q3 and Q4 are reversed biased rendering each device non-conductive. Thus, no current flows through light emitting diode L1 through LN whether or not a corresponding switch is closed.

The circuit of FIG. 5 has an advantage over the circuits of FIGS. 1 and 2 in that the supply voltage, VDD, need only be greater than the junction voltage drop across a LED. In the following explanation, it is assumed that switches S1 through SN have a negligent impedance when closed. When switch S1 is closed in the circuit of FIGS. 1 and 2 and a high level (binary "1") is applied to terminal T3, transistor Q1 will be conductive provided that its base-emitter semiconductor junction if forward biased and its base-collector semiconductor junction is reversed biased. This requires that the emitter voltage of transistor Q1 is greater than the base voltage of transistor Q1, which, in turn, must be greater than the collector voltage of transistor Q1. Therefore, the emitter voltage of Q1 must be greater than the collector voltage of transistor Q1. The emitter voltage of transistor Q1 is approximately equal to the difference of the supply voltage, VDD, and the reference voltage, VZ, for the reasons stated above. The collector voltage of transistor Q1 is equal to the junction voltage drop VL1, of LED L1. For the conduction of transistor Q1, it is required that:

$$VDD - VZ > VL1$$

or $$VDD > VL1 + VZ$$

In the circuit of FIG. 3, the conduction of transistor Q4 requires the emitter voltage of transistor Q4, equal to the supply voltage VDD, must be greater than the collector voltage of transistor Q4, equal to the junction voltage drop, VL1, of LED L1. In the circuit of FIG. 3, therefore, to ensure the conduction of transistor Q4, it is only required that:

$$VDD > VL1$$

Therefore, the circuit of FIG. 3 is advantageous where the sum of the reference voltage, VZ, and the LED junction voltage drop, VL1, exceeds the minimum power supply voltage.

If logic gate G1 is implemented utilizing CMOS technology, the circuits of FIGS. 1, 2, and 3 exhibit low power consumption relative to prior art circuits. If a low level (binary "0") is present at terminal T3, the only supply current drawn is that associated with the voltage reference diode DZ. If a high level (binary "1") is present at terminal T3 and a switch is closed, the only current in excess of the LED and voltage reference diode current is the small current sunk in logic gate G1 through resistor RB. If no switch is closed while there is a high level (binary "1") at terminal T3, the only current in excess of the current associated with the voltage reference diode DZ are small transistor leakage currents sunk in logic gate G1 through resistor RB.

Although, as set forth in the specification, it is preferable that the semiconductor device which couples the reference voltage across the current-control resistor, via the base-emitter semiconductor junction of the output transistor, has a matching voltage drop to the voltage drop across the base-emitter semiconductor junction, it is not intended that this preference should limit the scope of the invention. It should be noted that the only requirement necessary to practice the invention is that the variations in voltage drop of the semiconductor device coupling the reference voltage to the current-control resistor, via the base-emitter semiconductor junction of the output transistor, track the variations of the base-emitter semiconductor junction of the output transistor as a function of temperature or other operating conditions.

What is claimed is:

1. A constant current circuit, comprising:

an output transistor having emitter, base and collector electrodes defining an emitter-base junction and an emitter-collector path;

a unidirectional conduction device having a semiconductur junction with matched operating characteristics to that of said emitter-base junction being connected in parallel therewith and poled to conduct in the same direction;

a constant current path connected between a pair of power supply terminals and including in the order named, said emitter-collector path and a load;

a reference voltage device, a reference voltage terminal, and resistance means connected in a second path, in the order named, between said power supply terminals;

a junction point;

a current control resistor connected between said base and said junction point; and means including a semiconductor device coupling said reference voltage terminal to said junction point, the voltage across said semiconductor device varying in substantially the same manner as the voltage across said emitter-base junction with changes in operating parameters, said current-control resistor and said emitter-base junction being connected in series between one power supply terminal and said junction point and said reference voltage device and said semiconductor device, tracking said voltage variations of said emitter-base junction, being similarly connected in series between said one power supply terminal and said junction point so that said voltage variations of said emitter-base junction are substantially cancelled and are not established across said current-control resistor.

2. The circuit recited in claim 1 further including potential switching means connected to said junction point to render said output transistor and semiconductor device concurrently conductive or non-conductive.

3. The circuit recited in claim 2 wherein said potential switching means includes a CMOS logic element having its output resistively coupled to said junction point.

4. The circuit recited in claim 1 wherein said unidirectional conduction device is a second transistor, having emitter, base and collector electrodes, being of the same conduction type as said output transistor, and having matched operating characteristics of said output transistor, said emitter of said second transistor is connected to said emitter of said output transistor, and said base and collector of said second transistor are both connected to said base of said output transistor.

5. The circuit recited in claim 1 wherein said semiconductor device is a diode.

6. The constant current circuit recited in claim 1 wherein said load includes a light emitting diode.

7. The constant current circuit recited in claim 6 wherein said light emitting diode is connected in series with a switch.

8. A circuit comprising:

an output transistor having emitter, base and collector electrodes defining an emitter-base junction and an emitter-collector path;

a unidirectional conduction device having a semiconductor junction with matched operating characteristics to that of said emitter-base junction being connected in parallel therewith and poled to conduct in the same direction;

a constant current path connected between a pair of power supply terminals and including in the order named, said emitter-collector path, a light emitting diode and a switch;

a reference voltage device, a reference voltage terminal, and resistance means connected in a second path, in the order named, between said power supply terminals;

a junction point;

a current control resistor connected between said base and said junction point;

means including a semiconductor device coupling said reference voltage terminal to said junction point, the voltage across said semiconductor device varying in substantially the same manner as the voltage across said emitter-base junction with changes in operating parameters, said current-control resistor and said emitter-base junction being connected in series between one power supply terminal and said junction point and said reference voltage device and said semiconductor device, tracking said voltage variations of said emitter-base junction, being similarly connected in series between said one power supply terminal and said junction point so that said voltage variations of said emitter-base junction are substantially cancelled and are not established across said current-control resistor;

a CMOS logic element having its output resistively coupled to said junction point to render said output transistor and semiconductor device concurrently conductive or nonconductive.

9. A constant current circuit comprising:

an output transistor having emitter, base and collector electrodes defining an emitter-base junction and an emitter-collector path;

a load connected in a constant current path with said emitter-collector path between a pair of power supply terminals;

a reference voltage device, a reference voltage terminal and resistance means connected in a second path between said power supply terminals;

a junction point;

a current control resistor connected in series with said emitter-base junction between said junction point and one of said power supply terminals;

means including a semiconductor device coupling said reference voltage terminal to said junction point, the voltage across said semiconductor device varying in substantially the same manner as the voltage across said emitter-base junction with changes in operating parameters, said current-control resistor and said emitter-base junction being connected in series between one power supply terminal and said junction point and said reference voltage device and said semiconductor device, tracking said voltage variations of said emitter-base junction, being similarly connected in series between said one power supply terminal and said junction point so that said voltage variations of said emitter-base junction are substantially cancelled and do not appear across said current-control resistor; and potential switching means connected to said junction point to render said output transistor and said semiconductor device concurrently conductive or nonconductive.

10. The constant current circuit recited in claim 9 wherein said current-control resistor is connected between said power supply terminal and said emitter of said output transistor, said load is connected to said collector of said output transistor, and said junction point is connected to said base of said output transistor.

11. The constant current circuit recited in claim 9 wherein said load includes a light emitting diode.

12. The constant current circuit recited in claim 11 wherein said light emitting diode is connected in series with a switch.

13. The constant current circuit recited in claim 9 wherein said semiconductor device is a second transistor having emitter, base and collector electrodes but being of conductivity type opposite that of said ouput transistor, said emitter and base electrodes defining the ends of an emitter-base junction has a semiconductor voltage drop which, during conduction, varies in substantially the same manner as the voltage across said emitter-base junction of said output transistor varies with changes in operating parameters, said base of said second transistor is connected to said reference voltage terminal, said emitter of said second transistor is connected to said junction point, and said collector is coupled to a power supply terminal.

14. The constant-current circuit recited in claim 13 wherein said output transistor and said second transistor have matched operating characteristics.

15. The constant-current circuit recited in claim 9 wherein said semiconductor device is a diode.

16. The circuit recited in claim 9 wherein said potential switching means includes a CMOS logic element having its output resistively coupled to said junction point.

17. A circuit comprising:

an output transistor having emitter, base and collector electrodes defining an emitter base junction and an emitter-collector path;

a load including a light emitting diode connected in series with a switch connected in a constant current path with said emitter-collector path between a pair of power supply terminals;

a reference voltage device, a reference voltage terminal and resistance means connected in a second path between said power supply terminals;

a junction point;

a current control resistor connected in series with said emitter-base junction between said junction point and one of said power supply terminals;

means including a semiconductor device coupling said reference voltage terminal to said junction point, the voltage across said semiconductor device varying in substantially the same manner as the voltage across said emitter-base junction with changes in operating parameters, said current-control resistor and said emitter-base junction being connected in series between one power supply terminal and said junction point and said reference voltage device and said semiconductor device, tracking said voltage variations of said emitter-base junction, being similarly connected in series between said one power supply terminal and said junction point so that said voltage variations of said emitter-base junction are substantially cancelled and do not appear across said current-control resistor; and a CMOS logic element having its output resistively coupled to said junction point to render said output transistor and said semiconductor device concurrently conductive or nonconductive.

* * * * *